(12) United States Patent
Magcale

(10) Patent No.: US 11,182,201 B1
(45) Date of Patent: *Nov. 23, 2021

(54) SYSTEM AND METHOD FOR INTELLIGENT DATA CENTER POWER MANAGEMENT AND ENERGY MARKET DISASTER RECOVERY

(71) Applicant: Nautilus Data Technologies, Inc., Pleasanton, CA (US)

(72) Inventor: Arnold Castillo Magcale, San Ramon, CA (US)

(73) Assignee: Nautilus TRUE, LLC, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,669

(22) Filed: Oct. 8, 2019

Related U.S. Application Data

(63) Continuation of application No. 14/542,011, filed on Nov. 14, 2014, now Pat. No. 10,437,636.

(Continued)

(51) Int. Cl.
| | |
|---|---|
| *G05D 17/00* | (2006.01) |
| *G06F 9/48* | (2006.01) |
| *A63C 17/14* | (2006.01) |
| *G06F 9/50* | (2006.01) |
| *G05B 15/02* | (2006.01) |
| *G05F 1/66* | (2006.01) |
| *A63C 17/26* | (2006.01) |
| *F16M 13/02* | (2006.01) |
| *A63C 17/01* | (2006.01) |
| *F16B 9/02* | (2006.01) |

(Continued)

(52) U.S. Cl.
CPC ........ *G06F 9/4856* (2013.01); *A63C 17/1418* (2013.01); *A63C 17/26* (2013.01); *G05B 15/02* (2013.01); *G05F 1/66* (2013.01); *G06F 9/505* (2013.01); *A63C 17/01* (2013.01); *A63C 2017/1463* (2013.01); *A63C 2203/14* (2013.01); *F16B 2/065* (2013.01); *F16B 9/02* (2013.01); *F16M 11/04* (2013.01); *F16M 13/02* (2013.01); *Y02D 10/00* (2018.01); *Y10T 24/44017* (2015.01)

(58) Field of Classification Search
CPC .. G06F 9/4856; G06F 9/5077; G06F 9/45558; G06F 1/206; G06F 9/505; H02J 9/061; G01D 4/004; G05D 17/00; G05B 17/02; G05B 15/02; Y10T 24/44017; F16B 2/065; F16B 9/02; G05F 1/66; F16M 11/04; F16M 13/02; Y02D 10/00
See application file for complete search history.

*Primary Examiner* — Tuan A Vu
(74) *Attorney, Agent, or Firm* — Michael D. Eisenberg

(57) ABSTRACT

Systems and methods for intelligent data center power management and energy market disaster recovery comprised of data collection layer, infrastructure elements, application elements, power elements, virtual machine elements, analytics/automation/actions layer, analytics or predictive analytics engine, automation software, actions software, energy markets analysis layer and software and intelligent energy market analysis elements or software. Plurality of data centers employ systems and methods comprising a plurality of Tier 2 data centers that may be running applications, virtual machines and physical computer systems to enable data center and application disaster recovery from utility energy market outages. Systems and methods may be employed to enable application load balancing and data center power load balancing across a plurality of data centers by moving application and power loads from one data center location using power during peak energy hours to another data center location using power during off-peak hours.

18 Claims, 2 Drawing Sheets

Logical view

Related U.S. Application Data

(60) Provisional application No. 61/925,540, filed on Jan. 9, 2014.

(51) Int. Cl.
*F16B 2/06* (2006.01)
*F16M 11/04* (2006.01)

Logical view

Logical view data centers

SYSTEM AND METHOD FOR INTELLIGENT DATA CENTER POWER MANAGEMENT AND ENERGY MARKET DISASTER RECOVERY

CROSS REFERENCE TO RELATED APPLICATIONS

This application is a Continuation of patent application Ser. No. 14/542,011 filed on Nov. 14, 2014, entitled "A system and method for intelligent data center power management and energy market disaster recovery" which in turn claims priority from Provisional Patent application No. 61/925,540 filed on Jan. 8, 2014, entitled "A system and method for intelligent data center power management and energy market disaster recovery" the contents of which are incorporated by reference in their entirety.

FIELD

The present invention relates to intelligent power management and data recovery facilities.

BACKGROUND OF THE INVENTION

A data center is a facility designed to house, maintain, and power a plurality of computer systems. The computer systems within the data center are generally rack-mounted where a number of electronics units are stacked within a support frame.

A conventional Tier 4 data center is designed with 2N+1 redundancy for all power distribution paths. This means that each power distribution component is redundant (2 of each component) plus there is another component added for another layer of redundancy. Essentially, if N is the number of components required for functionality, then 2N would mean you have twice the number of components required. The +1 means not only do you have full redundancy (2N) but you also have a spare, i.e. you can take any component offline and still have full redundancy. With this design you can lose one of the three components but still retain full redundancy in case of failover. Building a Tier 4 data center is cost prohibitive due to the additional power distribution components that must be purchased to provide 2N+1 redundancy for all power distribution paths.

A conventional Tier 2 data center is designed with a single power distribution path with redundant power distribution components. Tier 2 data centers can be built with lower capital expenses but do not offer the same level of redundancy that many businesses running critical systems and applications require.

The described system and method for intelligent data center power management and energy market disaster recovery may employ continuous collection, monitoring and analysis of data from application services, power distribution components, virtual machines, data center facility infrastructure and utility energy markets to enable dynamic data center operation actions for migrating application loads and power loads from one data center to another without the need for manual intervention. The system and method may enable data center and application disaster recovery from utility energy market outages by quickly migrating applications loads from one data center location to another data center location.

SUMMARY

A computer automated system for intelligent power management, comprising a processing unit coupled to a memory element, and having instructions encoded thereon, which instructions cause the system to, via a collection layer, collect infrastructure data, application data, power data, and machine element data from a plurality of corresponding infrastructure elements, application elements, power elements, and virtual machine elements, respectively, and further cause the system to analyze the collected data by a single or plurality of analytic engines; and trigger, based on the analyzed collected data, a single or plurality of operational state changes.

In a computer automated system for intelligent power management and comprising a processing unit coupled to a memory element having instructions encoded thereon, a method comprising, via a collection layer, collecting infrastructure data, application data, power data, and machine element data from a plurality of corresponding infrastructure elements, application elements, power elements, and virtual machine elements, respectively, analyzing the collected data by a single or plurality of analytic engines; and further comprising triggering, based on the analyzed collected data, a single or plurality of operational state changes.

DETAILED DESCRIPTION OF THE INVENTION

Figure 1:
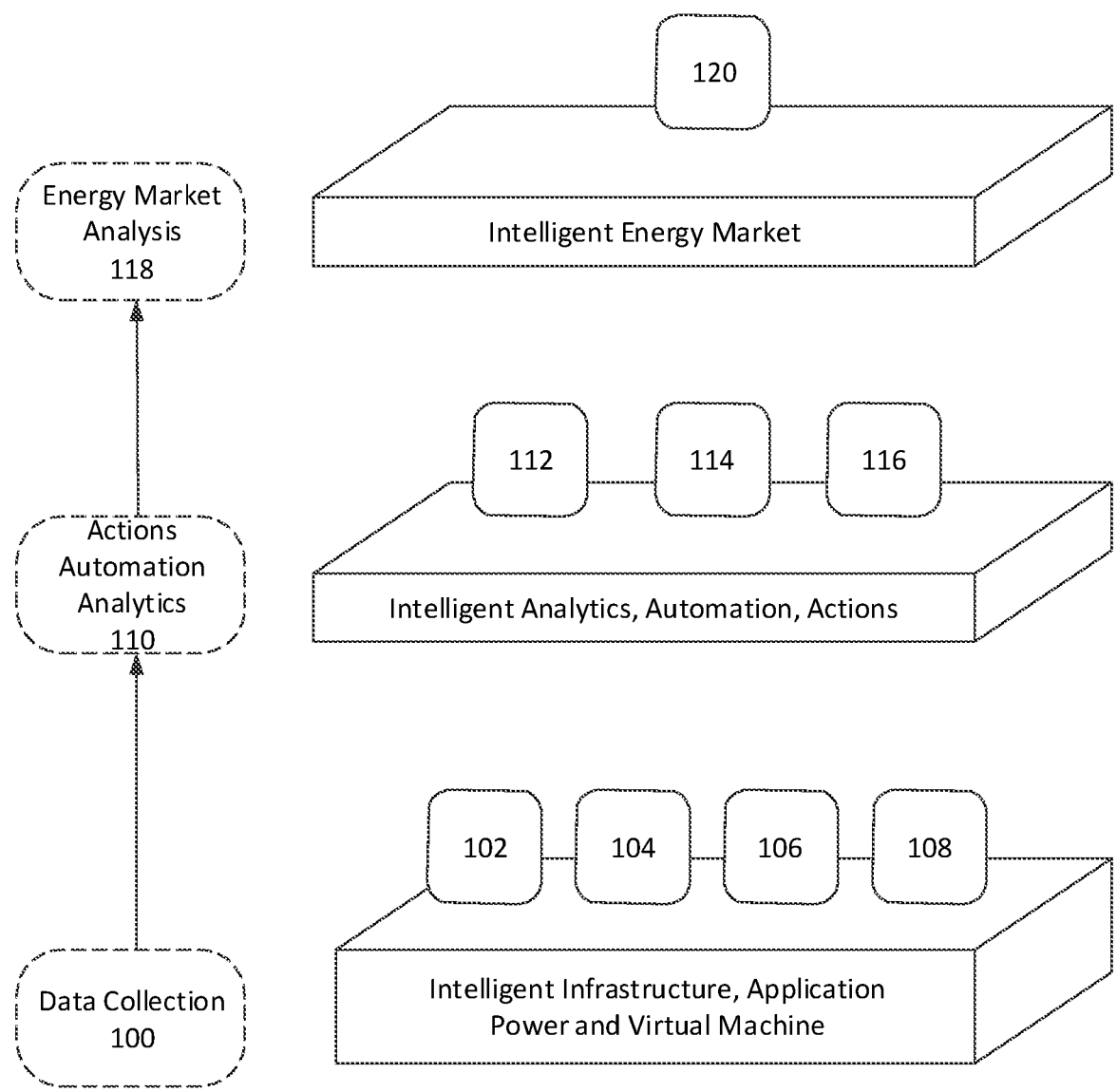
FIG. 1 illustrates a logical view of intelligent data center power management.

As stated above, A data center is a facility designed to house, maintain, and power a plurality of computer systems. The computer systems within the data center are generally rack-mounted where a number of electronics units are stacked within a support frame.

A conventional Tier 4 data center is designed with 2N+1 redundancy (where N is the number of power distribution components) for all power distribution paths, meaning each power distribution component is redundant (2 of each component) plus there is another component added for another layer of redundancy. With this design you can lose one of the three components but still retain full redundancy in case of failover. Building a Tier 4 data center is cost prohibitive due to the additional power distribution components that must be purchased to provide 2N+1 redundancy for all power distribution paths.

A conventional Tier 2 data center is designed with a single power distribution path with redundant power distribution components. Tier 2 data centers can be built with lower capital expenses but do not offer the same level of redundancy that many businesses running critical systems and applications require. Embodiments of the invention disclosed below solve this problem.

The system and method described may be employed to provide Tier 4 type levels of data center power redundancy in data centers built to Tier 2 standards. This drastically cuts capital expenses while providing the benefits of Tier 4 type levels of data center power redundancy.

The claimed invention differs from what currently exists. Embodiments disclosed include an improved and superior system and method. The disclosed embodiments may be employed to provide Tier 4 type levels of power distribution redundancy in data centers built to Tier 2 standards. Furthermore the systems and methods described include means to continuously monitor and analyze utility energy market status and enable intelligent application and data center load balancing that may provide financial benefits for moving applications and power loads from one data center location using power during peak energy hours to another data center location using power during off-peak hours. The described systems and methods may quickly move applications and power loads from one data center to another enabling disaster recovery from utility energy market outages.

Embodiments disclosed include improved and superior systems and methods. The claimed invention differs from what currently exists. The disclosed systems and methods may be employed to provide Tier 4 type levels of power distribution redundancy in data centers built to Tier 2 standards. Furthermore, in preferred embodiments, the systems and methods described may continuously monitor and analyze utility energy market status and enable intelligent application and data center load balancing that may provide financial benefits for moving applications and power loads from one data center location using power during peak energy hours to another data center location using power during off-peak hours. The described systems and methods may quickly move applications and power loads from one data center to another enabling disaster recovery from utility energy market outages.

Tier 2 data centers are not designed to provide Tier 4 type levels of redundancy and may not have the ability to easily migrate applications or power loads from data center to data center. This may prohibit intelligent power management across data centers and the ability for disaster recovery from utility energy market outages.

Embodiments disclosed include systems and methods for intelligent data center power management and energy market disaster recovery, and may employ continuous collection, monitoring and analysis of data from application services, power distribution components, virtual machines, data center facility infrastructure and utility energy markets to enable dynamic data center operation actions for migrating application loads and power loads from one data center to another without the need for manual intervention. The system and method may enable data center and application disaster recovery from utility energy market outages by quickly migrating applications loads from one data center location to another data center location FIG. 1 illustrates a logical view of intelligent data center power management. The system comprises a data collection layer 100, a single or plurality of infrastructure elements 102, a single or plurality of application elements 104, a single or plurality of power elements 106, a single or plurality of virtual machine elements 108, an analytics, automation, and actions layer 110 that comprises an analytics engine 112, an automation engine 114, and an action engine 116, an energy market analysis layer 118, and intelligent market elements 120. In the system, the data collection layer is caused to collect infrastructure data from a single or plurality of infrastructure elements 102, application data from a single or plurality of application elements 104, power data from a single or plurality of power elements 106, and virtual machine data from a single or plurality of virtual machine elements 108. A preferred embodiment also includes an analytics, automation, and actions layer 110, which comprises a single or plurality of analytics engines 112, a single or plurality of automation software engines 114, and a single or plurality of actions software engines 116. The embodiment further includes an energy market analysis engine 118, and a network connection to a single or plurality of energy markets 120

Figure 2:
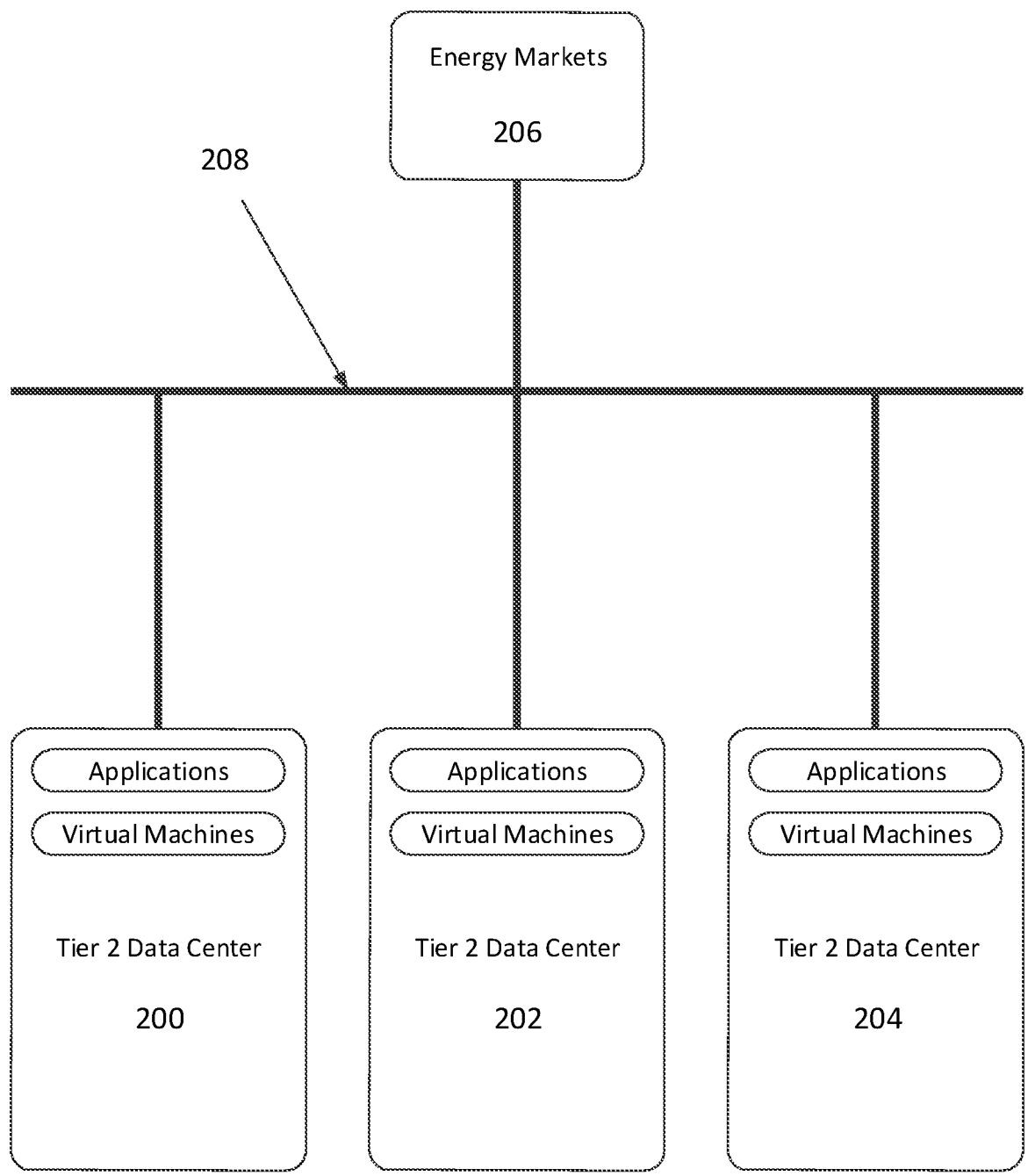
FIG. 2 illustrates a logical view of an embodiment employed in a data center.

One embodiment of the described system and method is shown in FIG. 1 (logical view) and FIG. 2 (logical data center view).

FIG. 1 shows a logical view entailed in an embodiment. An embodiment comprises a collection layer 100, infrastructure elements 102, application elements 104, power elements 106, virtual machine elements 108, analytics/automation/actions layer 110, analytics engine 112, automation software 114, actions software 116, energy markets analysis layer 118 and intelligent energy market 120 elements.

FIG. 2 shows a logical view of an embodiment employed in a data center. The illustrated embodiment includes systems and methods comprising of a plurality of Tier 2 data centers 200, 202, 204 that may all be running applications, virtual machines, and the described systems and methods, global energy markets 206 and an IP network 208.

According to an embodiment, data collection layer 100 continuously collects data from a plurality of infrastructure elements 102, application elements 104, power elements 106 and virtual machine elements 108. The data collected is then analyzed by a plurality of analytic engines 112 with the resulting data analysis triggering the automation software 114 and enabling the actions software 116 to make data center operational state changes for application load balancing or power load balancing across multiple data centers 200, 202, 204. Preferably, the data centers 200, 202, 204 are connected to one another by IP network 208 which may also connect to a plurality of energy markets. The energy market analysis layer 118 will use data collected from energy market 206 elements to automatically manage data center and application disaster recovery from utility energy market 206 outages.

According to an embodiment, data collected is used to measure or quantify parameters, and if these parameters fall within defined acceptable ranges, the logic causes the system to go to the next parameter. If the next parameter falls outside of the predefined acceptable ranges, defined actions will be executed to bring the said parameter within the acceptable range. For example, if the power load is greater than the power supply, the load is reduced or the supply is increased, to conform to a predefined range. After execution of the defined action, (in this case the power load and supply), the data for the same parameter will be collected again, the parameter will be checked again, and if the parameter now falls within the acceptable range, then the logic causes the system to move to the next parameter.

According to an embodiment the system and method includes means for intelligent management of data center power distribution loads, application loads and virtual machine loads, across multiple data centers. An embodiment includes a computer automated system comprising a processing unit coupled with a memory element, and having instructions encoded thereon, which instructions cause the system to automatically handle automated data center operation state changes, and to dynamically balance power loads and application loads across multiple data centers. The system further includes an analysis engine which comprises instructions that cause the system to collect and analyze data from a plurality of energy markets, and to enable automatic data center operation state changes, thereby enabling data center and application disaster recovery from utility energy market outages.

All of the elements above are necessary.

An additional, alternate embodiment includes a predictive analytics engine comprising instructions that cause the system to model and to enable scenario modeling for and of designated applications, virtual machines, and power loads.

Preferred embodiments can thus predict outages caused by energy market failures, application loads, virtual machine loads or power loads in a data center.

Yet another embodiment includes a system and method for automatically managing virtual machine instances, enabling the killing of virtual servers or banks of physical computer systems during low application loads and turning up virtual machines or banks of physical computer systems prior to expected peak loads.

The method and system may be deployed in a single central location to manage multiple data centers locations. Modifications and variations of the above are possible, and in some instances desirable, as would be apparent to a person having ordinary skill in the art.

Preferred embodiments disclosed can be employed to enable Tier 4 type level redundancy to existing Tier 2 data centers. Preferred embodiments can enable load balancing of applications and power loads across multiple existing data centers.

The described systems and methods may be employed to enable disaster recovery across multiple data centers for utility energy market outages.

Additionally: In another embodiment the systems and methods may be used for dynamic problem resolutions for applications, virtual machines, physical computer systems, network connectivity. The systems and methods may also be employed to analyze data center operation state before and after scheduled maintenance changes and may uncover unknown interdependencies or unanticipated changes in behavior.

The power management and energy market disaster recovery system and method is highly reconfigurable, and can be adapted for use in office buildings, residential homes, schools, government buildings, cruise ships, naval vessels, mobile homes, temporary work sites, remote work sites, hospitals, apartment buildings, etc. Other variations, modifications, and applications are possible, as would be apparent to a person having ordinary skill in the art.

Additionally, partial or complete embodiments of the disclosed invention can be utilized in alternate applications without departing from the scope and spirit of the disclosure. For example, the power management and energy market disaster recovery system and method is highly reconfigurable, and can be used in a variety of situations/applications, including but not limited to buildings or dwellings, in an energy—efficient and cost—effective manner.

Embodiments disclosed allow intelligent data center power management and energy market disaster recovery, employing continuous collection, monitoring and analysis of data from application services, power distribution components, virtual machines, data center facility infrastructure and utility energy markets to enable dynamic data center operation actions for migrating application loads and power loads from one data center to another without the need for manual intervention. Embodiments disclosed further enable data center and application disaster recovery from utility energy market outages by quickly migrating applications loads from one data center location to another data center location.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art that although the preferred and alternate embodiments have been shown and described in accordance with the Patent Statutes, the invention is not limited thereto or thereby.

The figures illustrate the architecture, functionality, and operation of possible implementations of systems and methods according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions.

The present invention and some of its advantages have been described in detail for some embodiments. It should be understood that although some example embodiments of the power management and energy market disaster recovery system and method are described with reference to a waterborne data center, the system and method is highly reconfigurable, and embodiments include reconfigurable systems that may be dynamically adapted to be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

The invention claimed is:

1. A computer automated system for intelligent power management, comprising a processing unit coupled to a memory element, and having instructions encoded thereon, which instructions cause the system to:
   trigger a collection of infrastructure data, application data, power data, and machine element data;
   based on the collected data, trigger an operational state change, wherein the triggered operational state change further comprises an infrastructure load balancing, an application load balancing and a power load balancing by the processing unit, across a plurality of data centers by real-time migration of an infrastructure load, an application load and a power load from one data center to another; and wherein the system is configured to allow each data center to communicate with each other data center over a network and to connect to a plurality of energy providers over the network.

2. The computer automated system of claim 1 wherein the system is further caused to:

analyze the collected infrastructure data, application data, power data, and machine element data by an analytic engine comprised in the computer automated system; and wherein the triggered operational state change further comprises a machine element load balancing by the processing unit.

3. The computer automated system of claim 1 wherein the system is further caused to:

via an energy market analysis layer, automatically in real-time, manage data center and application disaster recovery from utility energy market outages based on data collected from the plurality of energy providers over the network.

4. The computer automated system of claim 1 wherein the system is further caused to:

based on the collected data, measure a plurality of parameters wherein if the measured plurality of parameters fall outside of a predefined range, execute a predefined action to bring the said measured plurality of parameters within the predefined range.

5. The computer automated system of claim 1, wherein the system is further configured to:

manage in real time, data center power distribution loads, application loads and virtual machine loads, across multiple data centers.

6. The computer automated system of claim 1 wherein the system is further caused to:

automatically initiate datacenter operation state changes to balance infrastructure loads, power loads and application loads across multiple datacenters.

7. The computer automated system of claim 1 wherein the computer system is further configured to:

analyze data collected from the plurality of energy providers over the network; and based on the analyzed data, enable automatic datacenter operation state changes.

8. The computer automated system of claim 1 wherein the system is further caused to:

enable scenario modeling for and of designated applications, virtual machines, and power loads; and predict outages caused by energy provider failures to pre-empt real-time back-up or migration of infrastructure loads, application loads, virtual machine loads or power loads in a data center.

9. The computer automated system of claim 1 wherein the instructions further cause the system to:

automatically manage virtual machine instances, which comprises killing of virtual servers or banks of physical computer systems during low application loads and turning up virtual machines or banks of physical computer systems prior to expected peak loads.

10. In a computer automated system for intelligent power management and comprising a processing unit coupled to a memory element having instructions encoded thereon, a method comprising:

triggering a collection of infrastructure data, application data, power data, and machine element data;

based on the collected data, triggering an operational state change, wherein the triggered operational state change further comprises an infrastructure load balancing, an application load balancing and a power load balancing by the processing unit, across a plurality of data centers by real-time migration of an infrastructure load, an application load and a power load from one data center to another; and wherein the system is configured to allow each data center to communicate with each other data center over a network and to connect to a plurality of energy providers over the network.

11. The method of claim 10 further comprising:

analyzing the collected infrastructure data, application data, power data, and machine element data by an analytic engine comprised in the computer automated system; and wherein the triggered operational state change further comprises a machine element load balancing by the processing unit.

12. The method of claim 10 further comprising:

via an energy market analysis layer, automatically in real-time, managing data center and application disaster recovery from utility energy market outages based on data collected from the plurality of energy providers over the network.

13. The method of claim 10 further comprising:

based on the collected data, measuring a plurality of parameters wherein if the measured plurality of parameters fall outside of a predefined range, executing a predefined action to bring the said measured plurality of parameters within the predefined range.

14. The method of claim 10, further comprising:

managing in real time, data center power distribution loads, application loads and virtual machine loads, across multiple data centers.

15. The method of claim 10 further comprising:

automatically initiating datacenter operation state changes to balance infrastructure loads, power loads and application loads across multiple datacenters.

16. The method of claim 10 further comprising:

analyzing data collected from the plurality of energy providers over the network; and based on the analyzed data, enabling automatic datacenter operation state changes.

17. The method of claim 10 further comprising: enabling scenario modeling for and of designated applications, virtual machines, and power loads; and predicting outages caused by energy provider failures to pre-empt real-time back-up or migration of infrastructure loads, application loads, virtual machine loads or power loads in a data center.

18. The method of claim 10 further comprising:

automatically managing virtual machine instances, which comprises killing of virtual servers or banks of physical computer systems during low application loads and turning up virtual machines or banks of physical computer systems prior to expected peak loads.

* * * * *